US012593039B2

(12) United States Patent
Gao et al.

(10) Patent No.: US 12,593,039 B2
(45) Date of Patent: Mar. 31, 2026

(54) CROSS-COMPONENT SAMPLE OFFSET (CCSO) WITH ADAPTIVE MULTI-TAP-FILTER CLASSIFIERS

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 34 days.

(21) Appl. No.: 18/497,908

(22) Filed: Oct. 30, 2023

(65) Prior Publication Data

US 2025/0080729 A1     Mar. 6, 2025

Related U.S. Application Data

(60) Provisional application No. 63/535,468, filed on Aug. 30, 2023.

(51) Int. Cl.
H04N 19/00          (2014.01)
H04N 19/117          (2014.01)
(Continued)

(52) U.S. Cl.
CPC ......... H04N 19/117 (2014.11); H04N 19/124 (2014.11); H04N 19/132 (2014.11);
(Continued)

(58) Field of Classification Search
CPC .. H04N 19/117; H04N 19/124; H04N 19/132; H04N 19/136; H04N 19/157;
(Continued)

(56) References Cited

U.S. PATENT DOCUMENTS

| | | | |
|---|---|---|---|
| 11,750,846 | B2 | 9/2023 | Du et al. |
| 2022/0295053 | A1 | 9/2022 | Du et al. |

(Continued)

FOREIGN PATENT DOCUMENTS

WO     WO 2022218385 A1     10/2022

OTHER PUBLICATIONS

Tencent Technology, ISR/WO, PCT/US2023/036528, Feb. 21, 2024, 7 pgs.

*Primary Examiner* — Zhihan Zhou
(74) *Attorney, Agent, or Firm* — Morgan, Lewis & Bockius LLP

(57)          ABSTRACT

Various implementations described herein include methods and systems for coding video. In one aspect, a video bitstream includes a current coding block of an image frame, a first syntax element for a cross-component sample offset mode, and a second syntax element for a filter type and a filter shape index of a loop filter. Based on the loop filter, an electronic device identifies one or more neighboring luma samples of a first luma sample of the current coding block. The electronic device further determines and quantizes one or more difference values between the one or more neighboring luma samples and the first luma sample. The electronic device classifies a first color sample co-located with the first luma sample based on the quantized difference values to determine a first sample offset. The current coding block is reconstructed at least by adjusting the first color sample based on the first sample offset.

23 Claims, 10 Drawing Sheets

Communication System 100

(51) Int. Cl.

| | |
|---|---|
| *H04N 19/124* | (2014.01) |
| *H04N 19/132* | (2014.01) |
| *H04N 19/136* | (2014.01) |
| *H04N 19/157* | (2014.01) |
| *H04N 19/172* | (2014.01) |
| *H04N 19/176* | (2014.01) |
| *H04N 19/186* | (2014.01) |
| *H04N 19/70* | (2014.01) |
| *H04N 19/82* | (2014.01) |

(52) U.S. Cl.
CPC ......... *H04N 19/136* (2014.11); *H04N 19/157* (2014.11); *H04N 19/172* (2014.11); *H04N 19/176* (2014.11); *H04N 19/186* (2014.11); *H04N 19/70* (2014.11); *H04N 19/82* (2014.11)

(58) Field of Classification Search
CPC .. H04N 19/172; H04N 19/176; H04N 19/186; H04N 19/70; H04N 19/82
See application file for complete search history.

(56) References Cited

U.S. PATENT DOCUMENTS

| | | | |
|---|---|---|---|
| 2022/0295054 A1* | 9/2022 | Zhao | H04N 19/117 |
| 2022/0303584 A1 | 9/2022 | Du et al. | |
| 2023/0353792 A1 | 11/2023 | Du et al. | |
| 2023/0421759 A1 | 12/2023 | Du et al. | |
| 2025/0016308 A1* | 1/2025 | Yan | H04N 19/82 |

* cited by examiner

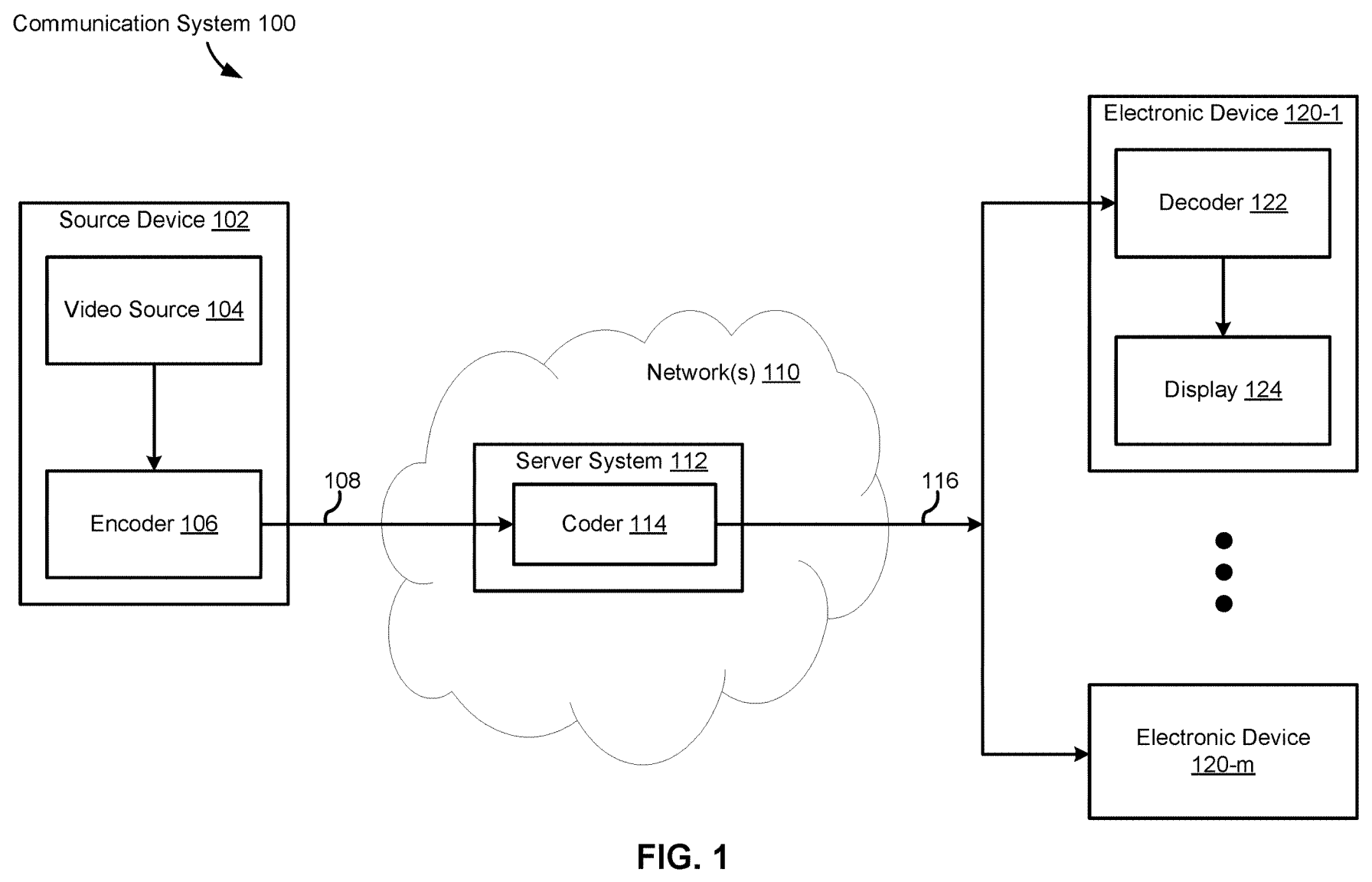

Communication System 100

Source Device 102

Video Source 104

Encoder 106

Network(s) 110

Server System 112

Coder 114

Electronic Device 120-1

Decoder 122

Display 124

Electronic Device 120-m

FIG. 1

Filter Type Index: (5-tap)
Filter Shape Index: {1, 2}, {1, 4}, {2, 3}, {3,4}, …. etc.

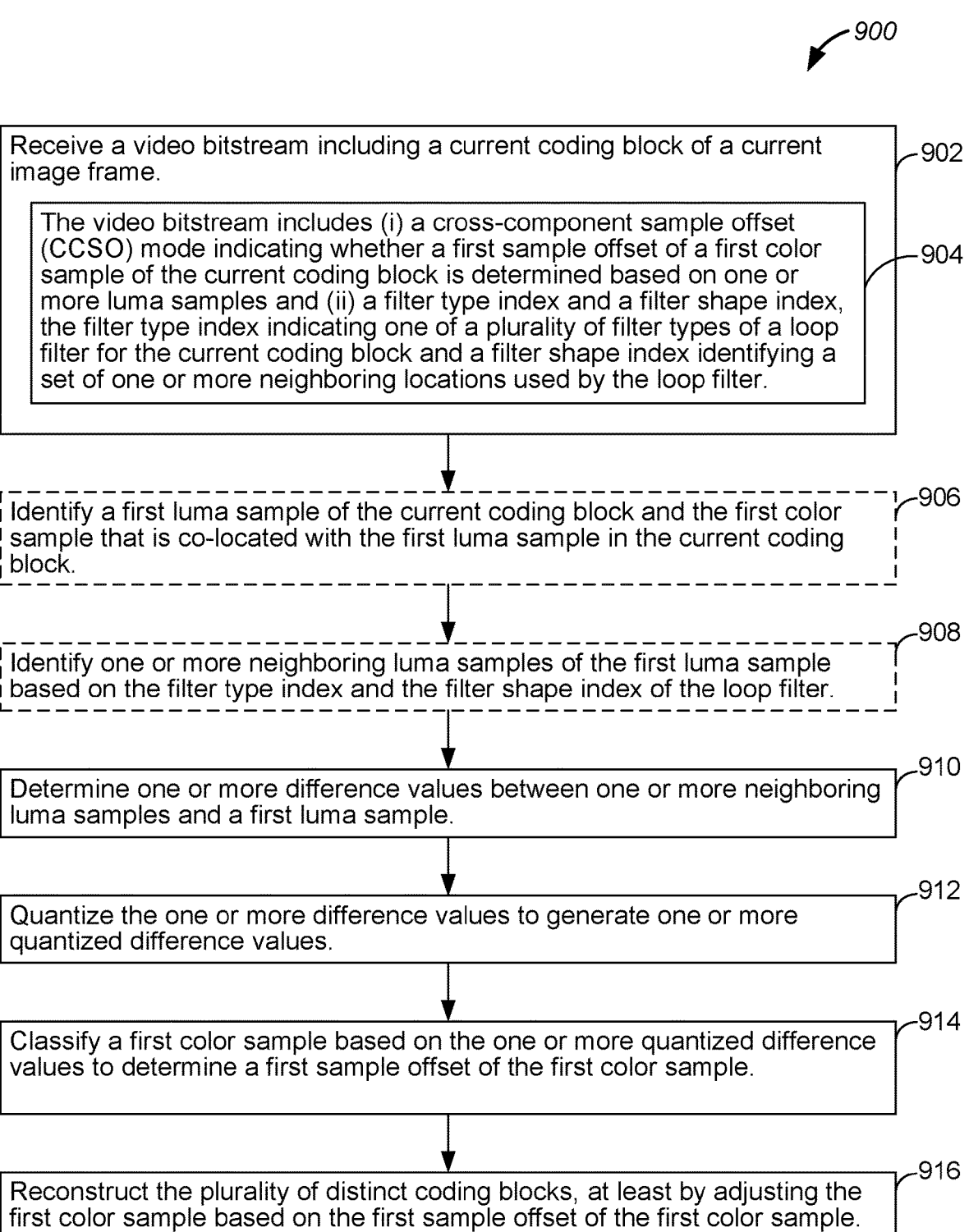

Receive a video bitstream including a current coding block of a current image frame. ⌐902

The video bitstream includes (i) a cross-component sample offset (CCSO) mode indicating whether a first sample offset of a first color sample of the current coding block is determined based on one or more luma samples and (ii) a filter type index and a filter shape index, the filter type index indicating one of a plurality of filter types of a loop filter for the current coding block and a filter shape index identifying a set of one or more neighboring locations used by the loop filter. ⌐904

Identify a first luma sample of the current coding block and the first color sample that is co-located with the first luma sample in the current coding block. ⌐906

Identify one or more neighboring luma samples of the first luma sample based on the filter type index and the filter shape index of the loop filter. ⌐908

Determine one or more difference values between one or more neighboring luma samples and a first luma sample. ⌐910

Quantize the one or more difference values to generate one or more quantized difference values. ⌐912

Classify a first color sample based on the one or more quantized difference values to determine a first sample offset of the first color sample. ⌐914

Reconstruct the plurality of distinct coding blocks, at least by adjusting the first color sample based on the first sample offset of the first color sample. ⌐916

FIG. 9

CROSS-COMPONENT SAMPLE OFFSET (CCSO) WITH ADAPTIVE MULTI-TAP-FILTER CLASSIFIERS

RELATED APPLICATIONS

This application claims priority to U.S. Provisional Patent Application No. 63/535,468, entitled "CCSO with Adaptive Multi-Tap-Filter Classifier," filed Aug. 30, 2023, which is hereby incorporated by reference in its entirety.

TECHNICAL FIELD

The disclosed embodiments relate generally to video coding, including but not limited to systems and methods for loop filtering (e.g., cross component offset filtering) of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/ H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/ decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes methods, systems, and non-transitory computer-readable storage media for applying a loop filter for video (image) compression. A video codec includes a plurality of function modules for one or more of: intra/inter prediction, transform coding, quantization, entropy coding, and in-loop filtering. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Examples of the first color component is a luma color component, and examples of the second color component is a chroma color component. In some implementations, the first color component and the second color component corresponds to the same color component, e.g., luma sample.

In accordance with some embodiments, a method of video decoding is provided. The method includes receiving a video bitstream including a current coding block of a current image frame. The video bitstream includes (i) a first syntax element for a cross-component sample offset (CCSO) mode indicating whether a first sample offset of a first color sample of the current coding block is determined based on one or more luma samples and (ii) a second syntax element for a filter type index and a filter shape index. The filter type index indicates one of a plurality of filter types of a loop filter selected for the current coding block, and the filter shape index identifies a set of one or more neighboring locations used by the loop filter. The method further includes determining one or more difference values between one or more neighboring luma samples and a first luma sample, quantizing the one or more difference values to generate one or more quantized difference values, classifying a first color sample based on the one or more quantized difference values to determine the first sample offset of the first color sample, and reconstructing the current coding block, at least by adjusting the first color sample based on the first sample offset of the first color sample.

In some embodiments, first color sample includes a first chroma sample that is co-located with the first luma sample in the current coding block, and the first chroma sample is adjusted based on the first sample offset. Alternatively, in some embodiments, the first color sample is the first luma sample, and the first luma sample is adjusted based on the first sample offset.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 9 is a flow diagram illustrating a method of coding video, in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
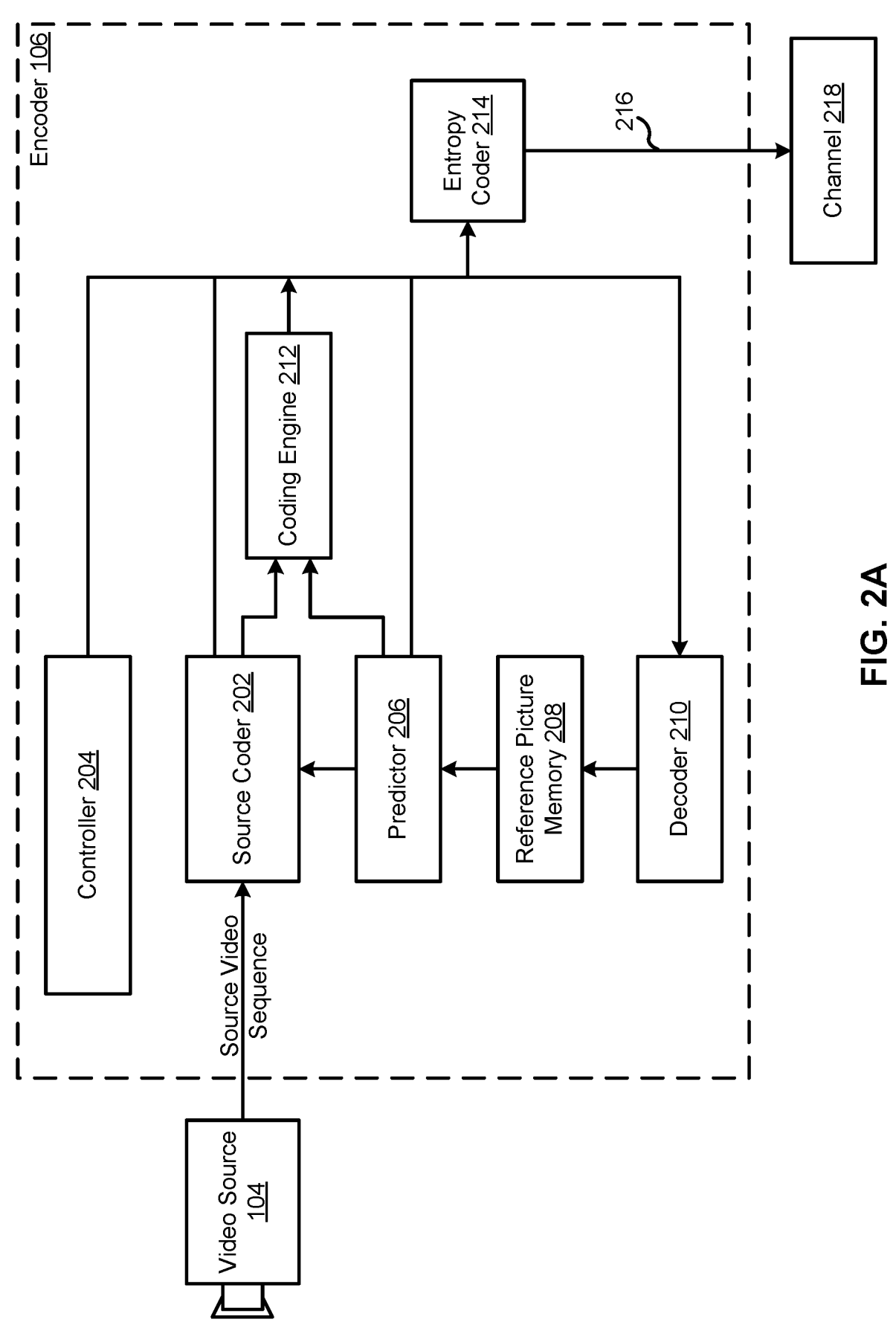
FIG. 2A is a block diagram illustrating example elements of an encoder component in accordance with some embodiments.

The present disclosure describes methods, systems, and non-transitory computer-readable storage media for applying a loop filter for video (image) compression. In-loop filtering technologies are applied to adjust reconstructed picture samples to further reduce a reconstruction error. A cross-component offset filtering method is implemented to apply a co-located reconstructed sample and associated neighboring reconstructed samples of a first color component to derive an offset value that is added on a current sample of a second color component, thereby adjusting a reconstruction value of the current sample. Specifically, in some embodiments, a decoder receives a video bitstream from an encoder including a current coding block of a current image frame. The video bitstream includes a filter type index and a filter shape index of the loop filter. The filter type index is configured to select one of a plurality of filter types (e.g., 2-tap, 3-tap, and 5-tap) of the loop filter for the current coding block. The filter shape index is configured to identify a set of one or more neighboring locations used by the loop filter. Based on the filter type index and the filter shape index of the loop filter, the decoder identifies one or more neighboring luma samples of the first luma sample. The decoder determines one or more difference values between the one or more neighboring luma samples and the first luma sample. The one or more difference values are quantized to generate one or more quantized difference values. The first color sample is classified, e.g., by a classifier, based on the one or more quantized difference values to determine the first sample offset of the first color sample. The first color sample is adjusted based on the first sample offset of the first color sample, thereby enabling reconstruction of the current coding block.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference image frames. In this manner, the coding engine 212 codes differences between pixel blocks of an input frame and pixel blocks of reference image frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference image frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference image frames and may cause reconstructed reference image frames to be stored in the reference picture memory 208. In this manner, the encoder component 106 stores copies of reconstructed reference image frames locally that have common content as the reconstructed reference image frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
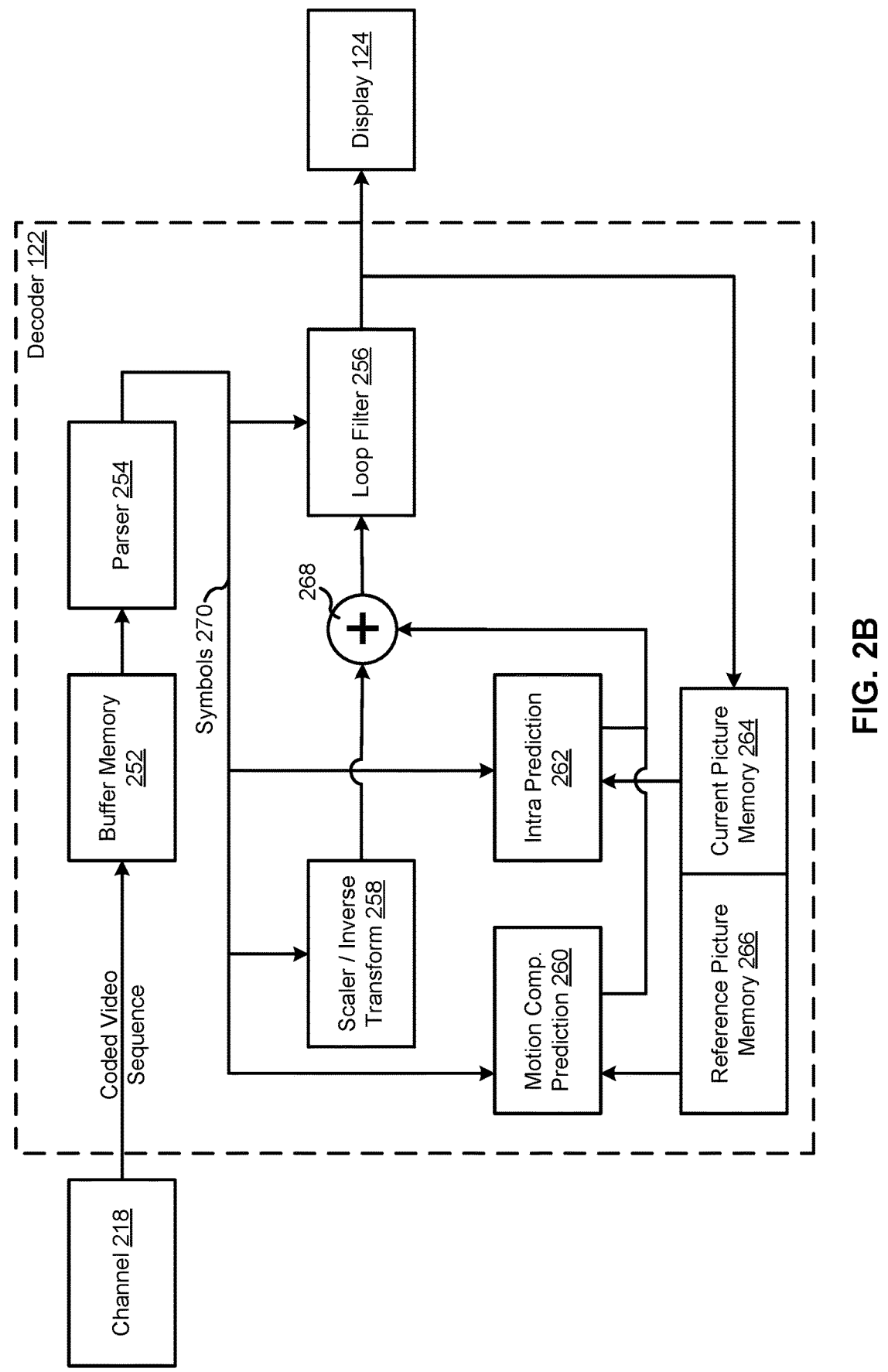
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/ inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
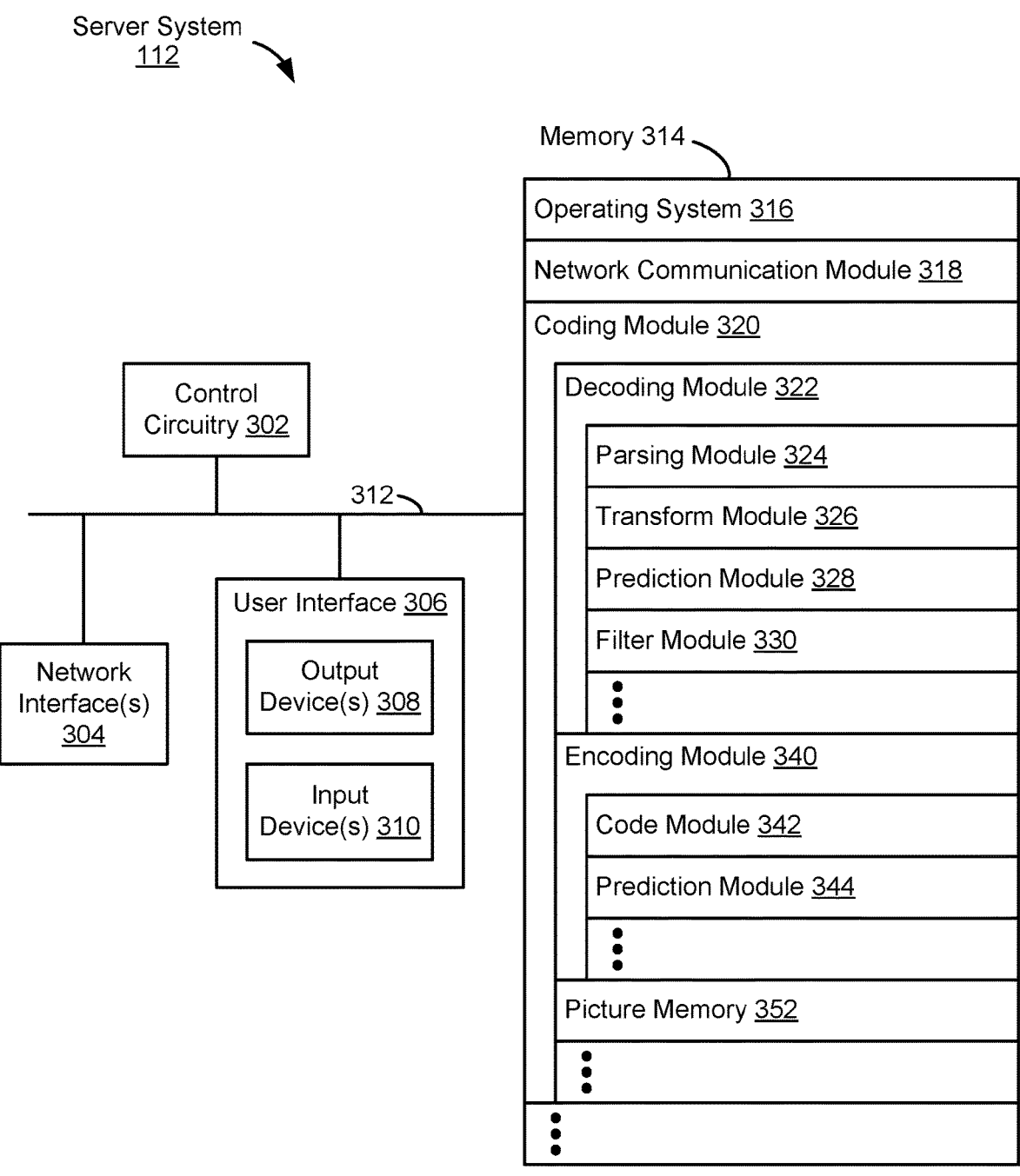
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
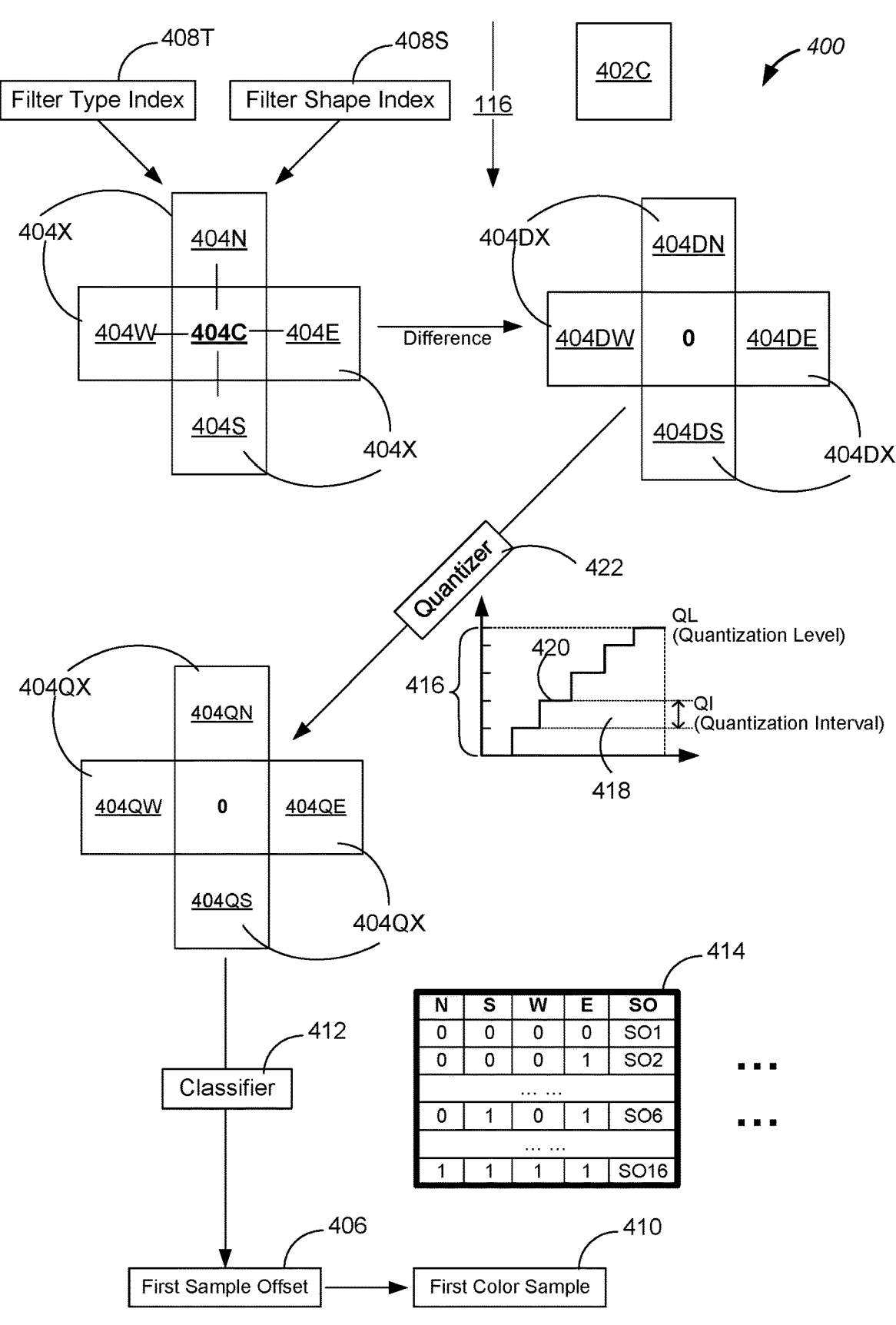
FIG. 4 is a flow diagram of an example process of applying in-loop filtering in video decoding, in accordance with some embodiments.

FIG. 4 is a flow diagram of an example process 400 of applying in-loop filtering in video decoding, in accordance with some embodiments. A GOP includes a sequence of image frames. The sequence of image frames includes a current image frame that further includes a current coding block. The current image frame includes a color image, i.e., a non-monochrome image frame, which has a plurality of color samples (e.g., chroma samples and luma samples) co-located with one another. After the plurality of color samples of the current image frame are reconstructed, in-loop filtering is applied to adjust a subset of color samples, thereby improving an image quality of the current image frame. A reconstructed sample and its neighboring reconstructed samples of a first color component are combined to derive an offset value for a second color component, and a reconstructed sample of the second color component is co-located with the reconstructed sample of the first color component and adjusted by the offset value. The first color component is optionally identical to or distinct from the second color component. For example, a first luma sample 404C and its neighboring luma samples 404X are combined to derive a sample offset 406, and a first chroma sample 402C is co-located with the first luma sample 404C and adjusted by the sample offset 406. Alternatively, in another example, the first luma sample 404C and its neighboring luma samples 404X are combined to derive the sample offset 406, which is applied to adjust the first luma sample 404C itself. During the course of combining the luma samples 404C and 404X, a loop filter 256 is applied to determine one or more of: a number, locations, and weights of neighboring luma samples 404X, which are applied to generate the sample offset 406.

A decoder 122 receives a video bitstream 116 from an encoder 106 including the current coding block of the current image frame. The video bitstream 116 includes (i) a cross-component sample offset (CCSO) mode and (ii) a filter type index 408T and a filter shape index 408S of the loop filter 256. The CCSO mode indicates a first sample offset 406 of a first color sample 410 of the current coding block is determined based on one or more luma samples (e.g., the first luma sample 404C, neighboring luma samples 404X). The filter type index 408T is configured to select one of a plurality of filter types of a loop filter 256 for the current coding block. The filter shape index 408S is configured to identify a set of one or more neighboring locations used by the loop filter 256. The first color sample 410 is co-located with the first luma sample 404C in the current coding block. In some embodiments, the filter type index 408T and the filter shape index 408S are signaled in the video bitstream 116 at one of an image frame level and a key frame level for the current coding block.

Based on the filter type index 408T and the filter shape index 408S of the loop filter 256, the decoder 122 identifies one or more neighboring luma samples 404X of the first luma sample 404C. For example, the one or more neighboring luma samples 404X include one or more of: a north neighboring luma sample (also called an above luma sample) 404N, a south neighboring luma sample (also called a below luma sample) 404S, a west neighboring luma sample (also called a left luma sample) 404W, and an cast neighboring luma sample (also called a right luma sample) 404E.

The decoder determines one or more difference values 404DX between the one or more neighboring luma samples 404X and the first luma sample 404C. For example, the one or more difference values 404DX includes one or more of: a north difference value 404DN, a south difference value 404DS, a west difference value 404DW, and an cast difference value 404DE. Each of the difference values 404DN, 404DS, 404DW, and 404DE are a difference between a respective one of the luma samples 404W, 404S, 404W, and 404E and the first luma sample 404C. The one or more difference values 404DX are quantized to generate one or more quantized difference values 404QX. For example, the one or more difference values 404QX includes one or more of: a north quantized difference value 404QN, a south quantized difference value 404QS, a west quantized difference value 404QW, and an cast quantized difference value 404QE. Each of the difference values 404DN, 404DS, 404DW, and 404DE is quantized to generate a respective one of the quantized difference values 404QN, 404QS, 404QW, and 404QE.

The first color sample 410 is classified, e.g., by a classifier 412, based on the one or more quantized difference values 404QX to determine the first sample offset 406 of the first color sample 410. In an example, the quantized difference values 404QX include the quantized difference values 404QN, 404QS, 404QW, and 404QE. A lookup table 414 maps a plurality of combinations of the quantized difference values 404QN, 404QS, 404QW, and 404QE to different sample offset options SO (e.g., SO1-SQ16). Based on the lookup table 414, the quantized difference values 404QX determined for the first luma sample 404C and neighboring luma samples 404X corresponds to one of the combinations in the lookup table 414, and a corresponding sample offset option SO is identified to correspond to a combination of the quantized difference values 404QX and therefore selected for the first sample offset 406. In other words, in some embodiments, the decoder 122 classifies the first color sample 410 by identifying a combination of the one or more quantized difference values 404QX in a lookup table 414 associating a plurality of quantized difference combinations with a plurality of offset value options SO (e.g., SO1-SO16) and determining the first sample offset 406 corresponding to the combination of the one or more quantized difference values in the lookup table 414.

Further, in some embodiments, the filter type index 408T selects one of a plurality of filter types of a loop filter 256 for the current coding block. The plurality of filter types of the loop filter includes a first number of filter types, and each filter type has a distinct number of filter taps. The lookup table 414 includes the first number of sub-tables each of which corresponds to a respective filter type. For example, the plurality of filter types includes three types (e.g., 2-tap, 3-tap, and 5-tap filters). The lookup table 414 includes three sub-tables corresponding to the 3 types of filters. A sub-table corresponding to a 2-tap, 3-tap, or 5-tap filter has 2, 3, or 4 columns, respectively. Additionally, in some embodiments, the filter shape index 408S selects one of a plurality of filter shapes corresponding to the filter type index 408T of the loop filter 256. Each filter type 408S (e.g., 3-tap filter) has a plurality of respective filter shapes each having a distinct combination of neighboring location(s). Each filter type corresponds to a respective sub-table that consolidates associations of the quantized difference combinations with the plurality of offset value options SO for the plurality of respective filter shapes 408S.

The first color sample 410 is adjusted based on the first sample offset 406 of the first color sample 410, thereby enabling reconstruction of the current coding block. In some embodiments, the first color sample 410 includes a first chroma sample 402C that is co-located with the first luma sample 404C in the current coding block, and the first chroma sample 402C is adjusted based on the first sample offset 406. Alternatively, in some embodiments, the first color sample 410 is the first luma sample 404C, and the first luma sample 404C is adjusted based on the first sample offset 406.

Figure 5A:
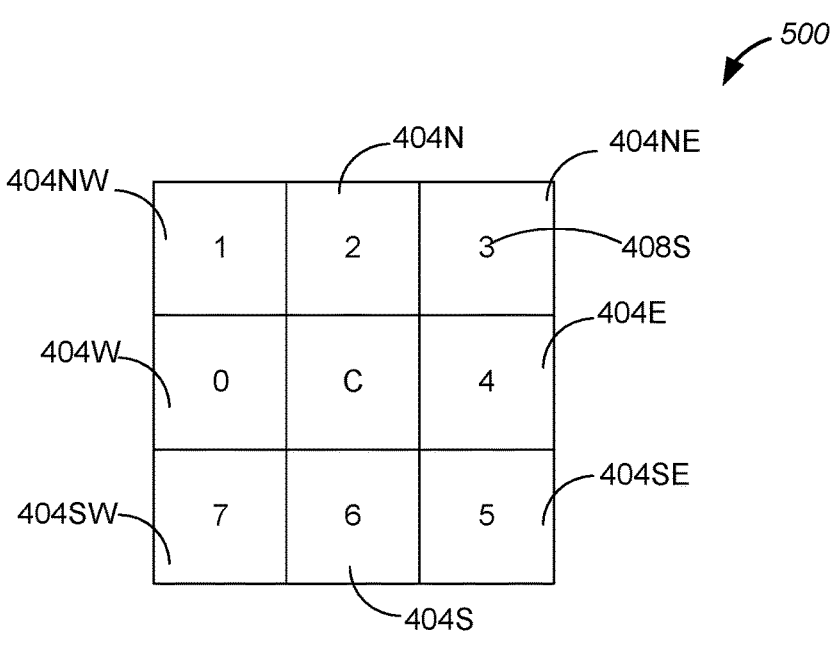
FIGS. 5A and 5B are diagrams illustrating positions of neighboring luma samples of an example two-tap loop filter used in a CCSO mode, in accordance with some embodiments.
Figure 5B:
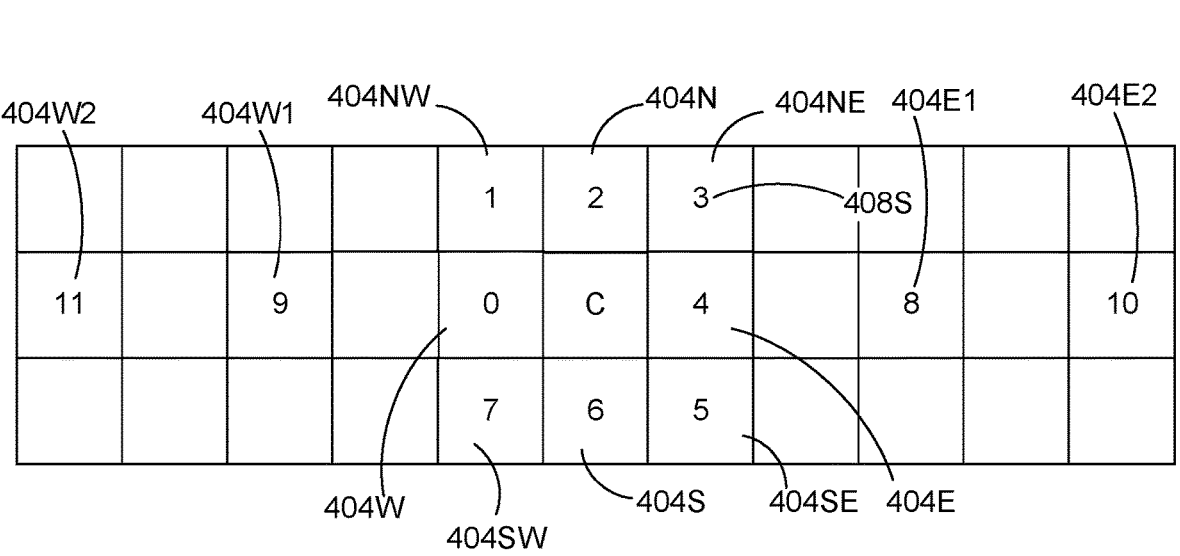
Figure 6A:
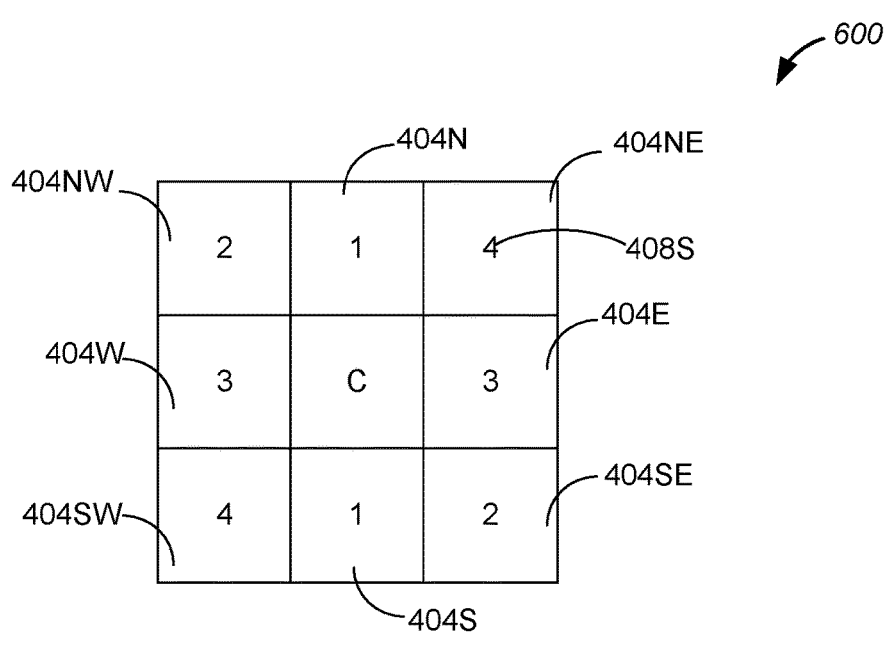
FIGS. 6A and 6B are diagrams illustrating positions of neighboring luma samples of an example three-tap loop filter used in a CCSO mode, in accordance with some embodiments.
Figure 6B:
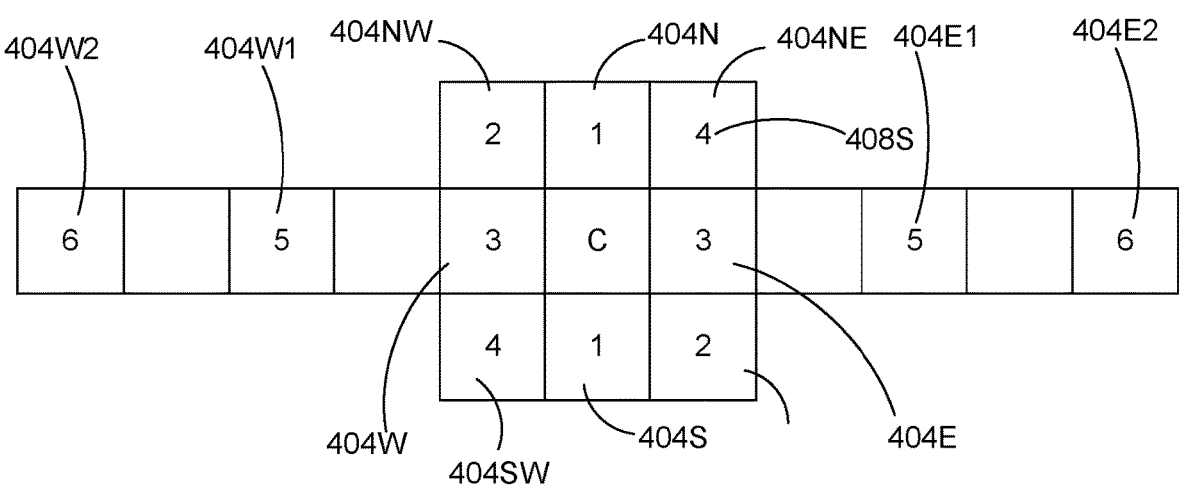

In some embodiments, the filter type index 408T includes a type flag configured to select one of a two-tap filter (FIGS. 5A and 5B) and a three-tap filter (FIGS. 6A and 6B). Alternatively, in some embodiments, the filter type index 408T includes a type flag configured to select one of a five-tap filter (FIG. 7) and a three-tap filter (FIGS. 6A and 6B). Alternatively, in some embodiments, the filter type index 408T includes a multi-bit (e.g., 2-bit) index configured to select one of at least a two-tap filter, a three-tap filter, and a five-tap filter.

In some embodiments, each of the plurality of filter types corresponds to a set of one or more candidate filter shape indexes 408S. Each candidate filter shape index 408S is unique and distinct from any other filter shape index 408S of the respective filter type and any remaining filter type of the plurality of filter types. For example, the plurality of filter types includes three types (e.g., 2-tap, 3-tap, and 5-tap filters). A 2-tap filter corresponds to a filter shape index 408S in a first range, e.g., 0-11. A 3-tap filter corresponds to a filter shape index 408S in a second range, e.g., 12-17, and a 5-tap filter corresponds to a filter shape index 408S in a third range, e.g., 18-22. The first, second, and third ranges are exclusive to one another (i.e., do not overlap).

FIGS. 5A and 5B are diagrams illustrating positions 500 and 550 of neighboring luma samples 404X of an example two-tap loop filter 256 used in a CCSO mode, in accordance with some embodiments. A decoder 122 receives a video bitstream 116 from an encoder 106 including the current coding block of the current image frame. The video bitstream 116 includes a filter type index 408T and a filter shape index 408S of the loop filter 256. The filter type index 408T is configured to select one of a plurality of filter types (e.g., 2-tap, 3-tap, and 5-tap) of the loop filter 256 for the current coding block. The filter shape index 408S is configured to identify a set of one or more neighboring locations used by the loop filter 256. Based on the filter type index 408T and the filter shape index 408S of the loop filter 256, the decoder 122 identifies one or more neighboring luma samples 404X of the first luma sample 404C. The decoder 122 determines one or more difference values 404DX between the one or more neighboring luma samples 404X and the first luma sample 404C. The one or more difference values 404DX are quantized to generate one or more quantized difference values 404QX. The first color sample 410 is classified, e.g., by a classifier 412, based on the one or more quantized difference values 404QX to determine the first sample offset 406 of the first color sample 410. The first color sample 410 is adjusted based on the first sample offset 406 of the first color sample 410, thereby enabling reconstruction of the current coding block.

In some embodiments, the filter type index 408T selects a two-tap loop filter 256 having two taps that includes the first luma sample 404C and a single neighboring luma sample 404X, and the filter shape index 408S identifies a single neighboring location of the neighboring luma sample 404X used by the loop filter 256. Referring to FIG. 5A, in some embodiments, the neighboring luma sample 404X is immediately adjacent to the first luma sample 404C. The filter shape index 408S is one of eight different values, e.g., successive integer values in a range of 0-7 inclusively. Specifically, in some situations, the decoder 122 identifies the one or more neighboring luma samples 404X of the first luma sample 404C by selecting one of a set of eight immediately adjacent luma samples 404NW, 404N, 404NE, 404E, 404SE, 404S, 404SW, and 404W as the one or more neighboring luma samples 404X based on the filter shape index 408S (e.g., having a value in 0-7) in accordance with a determination that the filter type index 408T selects a two-tap filter.

Referring to FIG. 5B, in some embodiments, the single neighboring luma sample 404X is immediately adjacent to, or separated by at least a row or column from, the first luma sample 404C. The filter shape index 408S is one of twelve different values, e.g., twelve successive integer values in a range of 0-11 inclusively. The filter shape index 408S having one of a first subset of values corresponds to a luma position that is immediately adjacent to the first luma sample 404C, and the filter shape index 408S having one of a second subset of values corresponds to a luma position that is separated from the first luma sample 404C. For example, the filter shape index 408S having a value of 2, 6, 0, or 4 corresponds to the neighboring luma sample 404N, 404S, 404W, or 404E, respectively. Conversely, the filter shape index 408S having a value above 7 (e.g., 8, 9, 10, 11) corresponds to a luma position that is located on the same row as, but separated by one or more columns from, a position of the first luma sample 404C. Specifically, in some situations, the decoder 122 identifies the one or more neighboring luma samples 404X of the first luma sample 404C by in accordance with a determination that the filter type index 408T selects a two-tap filter, selecting one of a set of twelve adjacent luma samples as the one or more neighboring luma samples 404X based on the filter shape index. The set of twelve adjacent luma samples includes eight immediately adjacent luma samples 404NW, 404N, 404NE, 404E, 404SE, 404S, 404SW, and 404W, two luma samples 404W1 and 404E1 located on the same row and separated from the first luma sample 404C by two luma samples, and two luma samples 404W2 and 404E2 located on the same row and separated from the first luma sample 404C by four luma samples.

FIGS. 6A and 6B are diagrams illustrating positions 600 and 650 of neighboring luma samples 404X of an example three-tap loop filter 256 used in a CCSO mode, in accordance with some embodiments. In some embodiments, the filter type index 408T selects a three-tap loop filter 256 having three taps that includes the first luma sample 404C and two neighboring luma samples 404X, and the filter shape index 408S identifies a pair of neighboring locations (i.e., two neighboring locations) of the neighboring luma sample 404X used by the loop filter 256. In some embodiments, the neighboring locations of the neighboring luma sample 404X are indexed in pair, e.g., two neighboring locations are indexed by the same filter shape index 408S. Additionally, in some embodiments, the two neighboring luma sample 404X that are indexed jointly using the same filter shape index 408S have symmetric positions with respect to that of the first luma sample 404C. Specifically, in some situations, the decoder 122 identifies the one or more neighboring luma samples 404X of the first luma sample 404C by, in accordance with a determination that the filter type index 408T selects a three-tap filter, selecting one of a plurality of distinct combinations of two neighboring locations (e.g., as the one or more neighboring luma samples 404X based on the filter shape index 408S.

Referring to FIG. 6A, in some embodiments, the two neighboring luma samples 404X selected by the filter shape index 408S are immediately adjacent to the first luma sample 404C. The filter shape index 408S is one of four different values, e.g., successive integer values in a range of 1-4 inclusively. Specifically, in some situations, the decoder 122 identifies the plurality of distinct combinations of two neighboring locations comprising at least (1) a first combination of a north luma sample 404N and a south luma sample 404S. (2) a second combination of a west luma sample 404W and an cast luma sample 404E. (3) a third combination of a northwest luma sample 404NW and a southeast luma sample 404SE, and (4) a fourth combination of a northeast luma sample 404NE and a southwest luma sample 404SW.

Referring to FIG. 6B, in some embodiments, the two neighboring luma sample 404X identified by the same filter shape index 408S is immediately adjacent to, or separated by at least a row or column from, the first luma sample 404C. For example, the filter shape index 408S is one of six different values, e.g., six successive integer values in a range of 1-6 inclusively. The filter shape index 408S having one of a first subset of values (e.g., 1, 2, 3, 4) corresponds to luma positions adjacent to the first luma sample 404C, and the filter shape index 408S having one of a second subset of values (e.g., 5, 6) corresponds to luma positions separated from the first luma sample 404C. For example, the filter shape index 408S having a value of 1, 2, 3, or 4 corresponds to the neighboring luma sample pair 404N and 404S, 404NW and 404SE, 404W and 404E, or 404NE and 404SW, respectively. Conversely, the filter shape index 408S having a value of 5 or 6 corresponds to the neighboring luma sample pair 404W1 and 404E1 or pair 404W2 and 404E2, respectively. Specifically, in some situations, the decoder 122 identifies the plurality of distinct combinations of two neighboring locations comprising at least the first, second, third, and fourth combinations, a fifth combination of two luma samples 404W1 and 404E1 located on the same row and separated from the first luma sample by two luma samples, and a sixth combination of two luma samples 404W2 and 404E2 located on the same row and separated from the first luma sample by four luma samples.

Further, in some embodiments, the filter shape index 408S selects one of a plurality of filter shapes corresponding to the filter type index 408T of the loop filter 256. The selected filter type 408S (e.g., 3-tap filter) has a plurality of respective filter shapes (e.g., six shapes indexed by 1-6 in FIG. 5B) each having a distinct combination of neighboring location(s). In some embodiments, each filer shape has a respective lookup sub-table. For a 3-tap filter, 6 filter shapes (FIG. 5B) corresponds to 6 lookup sub-tables, and each sub-table associates quantized difference combinations of corresponding luma samples 404X with offset value options SO. Alternatively, in some embodiments, each filter type corresponds to a single sub-table that consolidates associations of the quantized difference combinations with the plurality of offset value options SO for the plurality of respective filter shapes 408S. Stated another way, for a 3-tap filter, the 6 lookup sub-tables of the 6 filter shapes (FIG. 5B) are consolidated into the single sub-table of the respective filter type (e.g., the 3-tap filter).

Figure 7:
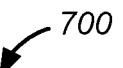
FIG. 7 is a diagram illustrating positions of neighboring luma samples of an example five-tap loop filter used in a CCSO mode, in accordance with some embodiments.
Figure 7:
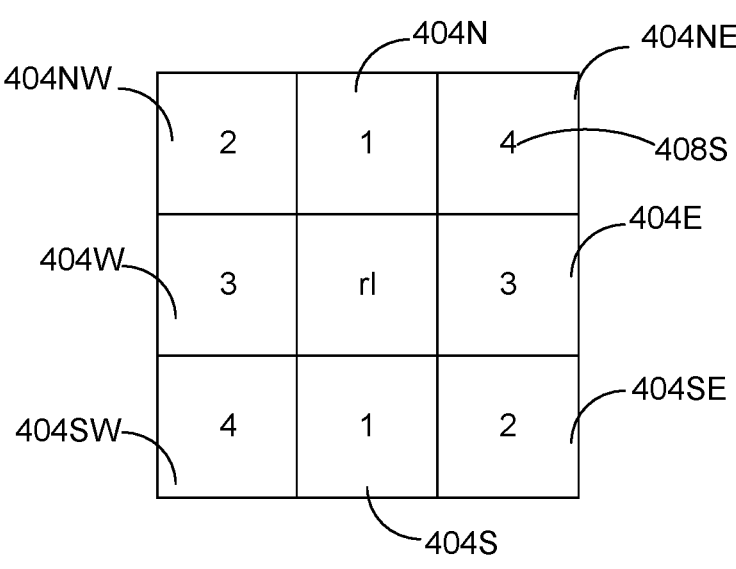

FIG. 7 is a diagram illustrating positions 700 of neighboring luma samples 404X of an example five-tap loop filter 256 used in a CCSO mode, in accordance with some embodiments. In some embodiments, the filter type index 408T selects a five-tap loop filter 256 having five taps that includes the first luma sample 404C and four neighboring luma samples 404X, and the filter shape index 408S identifies two pairs of neighboring locations (i.e., four neighboring locations) of the neighboring luma sample 404X used by the loop filter 256. In some embodiments, the neighboring locations of the neighboring luma sample 404X are indexed in pair, e.g., four neighboring locations are indexed by the filter shape index 408S having two index numbers. The two index numbers of the filter shape index 408S select two pairs of neighboring luma samples 404X, respectively. Additionally, in some embodiments, the two pairs of neighboring luma sample 404X that are indexed jointly using the filter shape index 408S have symmetric positions with respect to that of the first luma sample 404C. Specifically, in some situations, the decoder 122 identifies the one or more neighboring luma samples 404X of the first luma sample 404C by, in accordance with a determination that the filter type index 408T selects a five-tap filter, concurrently selecting two of a plurality of distinct combinations of two neighboring locations as the one or more neighboring luma samples 404X based on the filter shape index 408S.

In some embodiments, eight immediately adjacent luma samples are divided into four pairs indexed by four different numbers. The four neighboring luma samples 404X (i.e., two pairs of samples 404X) selected by the filter shape index 408S are immediately adjacent to the first luma sample 404C, and identified by two of the four different numbers. The filter shape index 408S includes the two of the four different values, e.g., two of 1-4. Specifically, in some situations, the decoder 122 identifies the plurality of distinct combinations of two neighboring locations comprising at least (1) a first combination of a north luma sample 404N and a south luma sample 404S, e.g., corresponding to a number of "1"; (2) a second combination of a west luma sample 404W and an cast luma sample 404E, e.g., corresponding to a number of "2"; (3) a third combination of a northwest luma sample 404NW and a southeast luma sample 404SE, e.g., corresponding to a number of "3"; and (4) a fourth combination of a northeast luma sample 404NE and a southwest luma sample 404SW, e.g., corresponding to a number of "4." In an example, the filter shape index 408S includes "1" and "3," selecting the neighboring luma samples 404N, 404S, 404W, and 404S to generate the first sample offset 406.

Figure 8A:
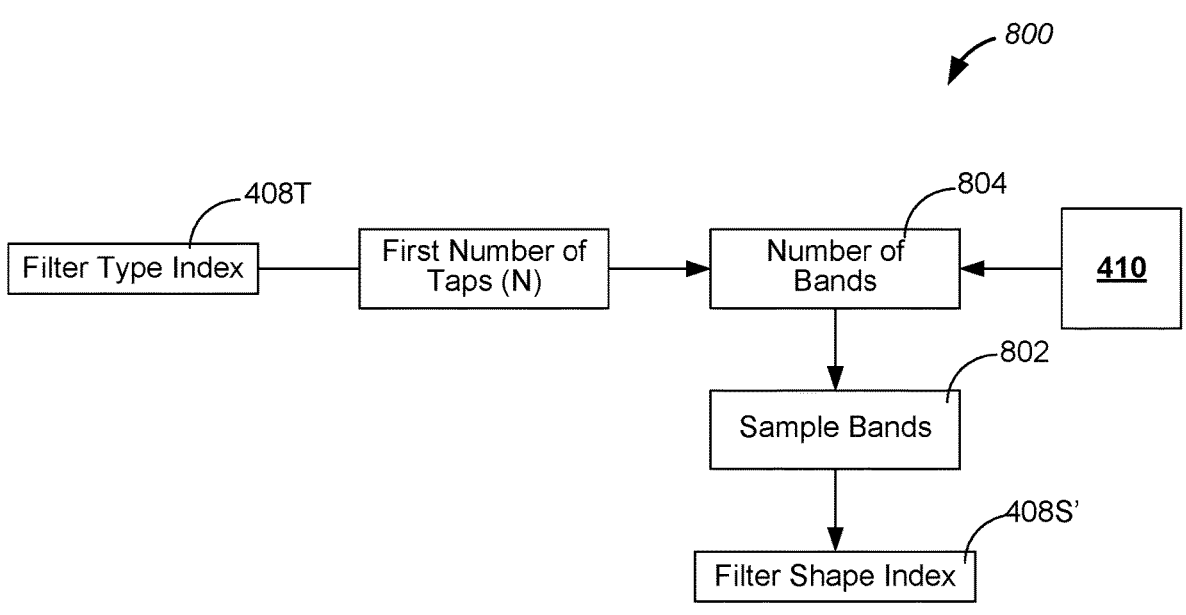
FIG. 8A is a flow diagram of an example process of applying band-based in-loop filtering, in accordance with some embodiments.

FIG. 8A is a flow diagram of an example process 800 of applying band-based in-loop filtering, in accordance with some embodiments. As explained above, a decoder 122 receives a video bitstream 116 signaling a filter type index 408T and a filter shape index 408S of a loop filter 256. The filter type index 408T is configured to select one of a plurality of filter types (e.g., 2-tap, 3-tap, and 5-tap) of the loop filter 256 for a current coding block. The filter shape index 408S is configured to identify a set of one or more neighboring locations used by the loop filter 256. Based on the filter type index 408T, the decoder 122 selects one of a plurality of filter types (e.g., 2-tap, 3-tap, and 5-tap) of the loop filter 256. The loop filter 256 of the selected filter type has a first number N of taps. The first color sample 410 corresponds to a plurality of bands 802. The decoder 122 determines a number of bands 804 in the plurality of bands based on the first number N. Each band corresponds to a respective value of the filter shape index 408S' that identifies a respective set of one or more neighboring locations used by the loop filter 256.

The decoder 122 identifies one of the plurality of bands that includes the first color sample 410 based on a value of the first color sample 410. Based on the identified one of the plurality of bands, the decoder 122 identifies the respective value of the filter shape index 408S' and the respective set of one or more neighboring locations, thereby selecting the one or more neighboring luma samples 404X for generating the first sample offset 406. Stated another way, the filter shape index 408S' is determined by the decoder 122 and applied in place of the filter shape index 408S received in the video bitstream.

In an example, the first color sample 410 is the first chroma sample 402C. The filter type index 408T identifies a 2-tap loop filter 256. The first number N is equal to 2, so is the number of bands 804. Chroma values are in a range of [0-1023], and corresponds to two bands of [0, 511] and [512, 1023], which further corresponds to a first value and a second value of the filter shape index 408S, respectively. Referring to FIG. 5A, the first value and the second value are equal to 8 and 4, and the neighboring luma samples 404X used to classify the quantized difference values 404QX (FIG. 4) and generate the first sample offset 406 are the luma samples 404W and 404E for the two different bands, respectively. In some situations, the first chroma sample 402C has a value of 490, and the luma sample 404W is applied to classify a quantized difference value 404QW and generate the first sample offset 406. Alternatively, in some situations, the first chroma sample 402C has a value of 890, and the luma sample 404E is applied to classify a quantized difference value 404QE and generate the first sample offset 406.

Figure 8B:
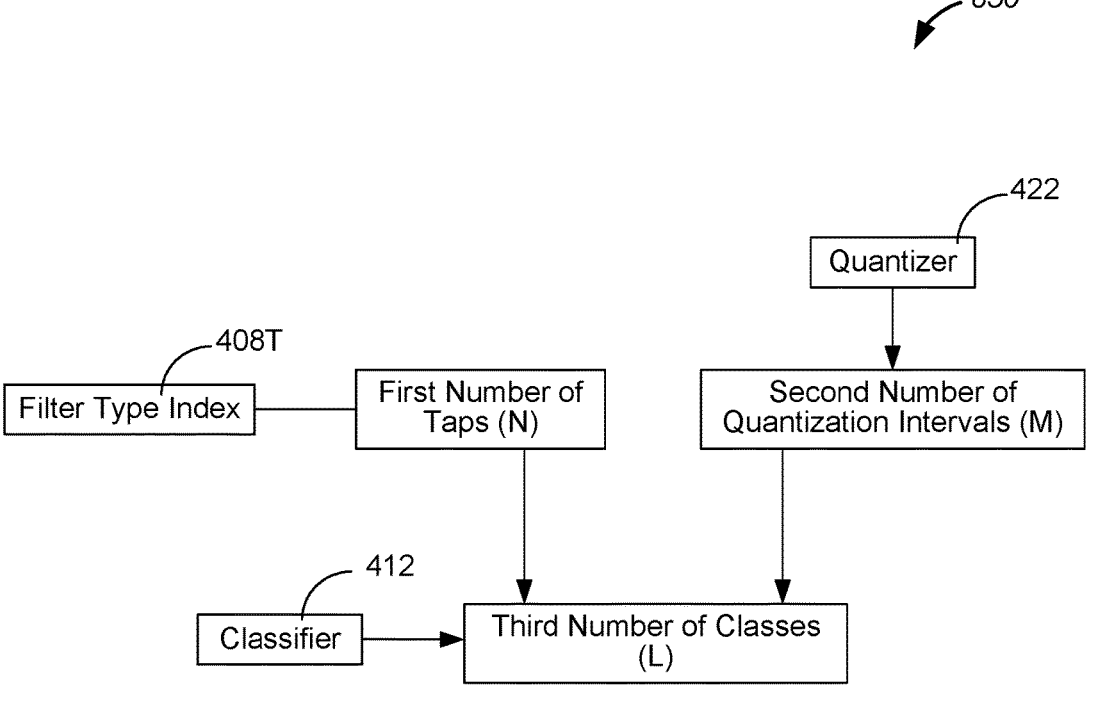
FIG. 8B is a flow diagram of an example process of implementing dynamic filter type based classification during in-loop filtering, in accordance with some embodiments.

FIG. 8B is a flow diagram of an example process 850 of implementing dynamic filter type based classification during in-loop filtering, in accordance with some embodiments. A decoder 122 receives a video bitstream 116 signaling a filter type index 408T and a filter shape index 408S of a loop filter 256. Based on the filter type index 408T and the filter shape index 408S of the loop filter 256, the decoder 122 identifies one or more neighboring luma samples 404X of the first luma sample 404C. The decoder 122 determines one or more difference values 404DX between the one or more neighboring luma samples 404X and the first luma sample 404C. The one or more difference values 404DX are quantized to generate one or more quantized difference values 404QX. The first color sample 410 is classified, e.g., by a classifier 412, based on the one or more quantized difference values 404QX to determine the first sample offset 406 of the first color sample 410. The first color sample 410 is adjusted based on the first sample offset 406 of the first color sample 410, thereby enabling reconstruction of the current coding block.

In some embodiments, the one or more difference values 404DX are quantized to a plurality of integer values in a quantization range 416 (FIG. 4) using a scalar quantizer 422 (FIG. 4) including a plurality of quantization intervals 418 (QI) and a plurality of quantization levels 420 (QL), and each of the one or more quantized difference values 404DX includes a respective integer in the quantization range 416. For each integer value in the quantization range 416, a quantization interval 418 is defined to be a range of difference values 404DX assigned to the respective integer value. A quantization level 420 corresponds to the respective integer value to which the range of difference values associated with the quantization interval 418 are assigned. Further, in some embodiments, the one of the plurality of filter types of the loop filter selected by the filter type index 408T has a first number N of taps. The plurality of quantization intervals includes a second number M of quantization intervals. The first color sample 410 is classified by a classifier 412 (FIG. 4) having a third number L of classes, where L is equal to $M^N$. For example, when two-tap filters (FIGS. 5A and 5B) are applied, the number of classes (e.g., the number of entries in the offset look-up table 414) is determined as $M^2$.

Additionally, in some embodiments, the one of the plurality of filter types of the loop filter 256 selected by the filter type index 408T has a first number N of taps, and the plurality of quantization intervals 418 includes a second number M of quantization intervals. In accordance with the first number N, the decoder 122 determines the second number M and the plurality of quantization levels 420.

In some embodiments, the one of the plurality of filter types of the loop filter 256 selected by the filter type index 408T has a first number N of taps. The first color sample 410 is classified by a classifier 412 (FIG. 4) has a third number L of classes. The decoder 122 determines the third number L based on the first number N.

FIG. 9 is a flow diagram illustrating an example method 900 of coding video, in accordance with some embodiments. The method 900 may be performed at a computing system (e.g., the server system 112, the source device 102, or the electronic device 120 in FIG. 1) having control circuitry and memory storing instructions for execution by the control circuitry. In some embodiments, the method 900 is applied jointly with one or more video codecs, including but not limited to, H.264, H.265/HEVC, H.266/VVC, AV1 and AVS/AVS2/AVS3. In some embodiments, the method 900 is performed by executing instructions stored in the memory (e.g., the coding module 320 of the memory 314) of the computing system. In some embodiments, the computing system communicates (902) a video bitstream 116 from an encoder 106 to a decoder 122, and the video bitstream 116 includes the current coding block of the current image frame. The video bitstream 116 includes (904) (i) a cross-component sample offset (CCSO) mode and (ii) a filter type index 408T and a filter shape index 408S of the loop filter 256.

The computing system identifies (906) a sample of a first color component (e.g., a first luma sample 404C) of the current coding block and the first color sample 410 of a second color component that is co-located with the sample of the first color component in the current coding block, and identifies (908) one or more neighboring samples of the sample of the first color component (e.g., one or more neighboring luma samples 404X of the first luma sample 404C) based on the filter type index 408T and the filter shape index 408S of the loop filter 256. Difference values 404DX are determined (910) between the co-located reconstructed luma sample and its neighboring reconstructed samples from the first color component (e.g., between the first luma sample 404C and neighboring luma samples 404X). Positions of the neighboring reconstructed samples (e.g., the neighboring luma samples 404X) are selected based on given filter shape 408S.

The difference values 404DX are quantized (912) using a scalar quantizer 422 (FIG. 4), which is specified by quantization intervals 418 (QI) and quantization levels 420 (QL). A quantization interval 418 (QI) is defined to be the range of values assigned to the same integer, and a quantization level 420 (QL) is defined as the integer value to which all values within a corresponding quantization interval 418 (QI) are assigned. Quantized difference values 404QX are applied to classify the first color sample 410, thereby determining the first sample offset 406 of the first color sample 410. For example, combinations of quantized difference values 404QX are associated with indices in a selected look-up table 414 (FIG. 4), and an output of the selected look-up table 414 includes a value of the first sample offset 406. Such a cross-component sample offset filtering method is based on an edge preserving loop filter 256 that uses the reconstructed samples (e.g., 404C, 404X, 402C, 410) to compute the sample offset 406 of luma and/or chroma components. In some embodiments, samples surrounding a current color sample ("C" in FIG. 6B) are used in a three-tap filter to classify the current color sample, which is used in a band or edge offset. In some embodiments, an adaptive multi-tap-filter classifier is applied.

In some embodiments, a multi-tap-filter classifier 412 (FIG. 4) is used to classify the current central sample (e.g., first luma sample 404C) in the cross-component sample offset process. The pre-defined filter shapes (i.e., used surrounding samples) are optionally identical to or different from a design in FIG. 6B.

In some embodiments, a two-tap-filter 256 (FIGS. 5A and 5B) is used in the classification. In the frame level (or any other level where the sample offset control information signaled), a flag is signaled if the newly introduced two-tap filter or the original three-tap filter is used. If this flag is in one value (e.g., true), the direction of the filter is further signaled to indicate which sample location is used. For example, if the flag indicates that two-tap filter is used, and the filter shape index is indicated "1" (i.e., the sample marked as 1 in FIG. 5B). In another example, an additional filter shape and direction is signaled for the two-tap filter. If the signaled filter shape index has a first value (e.g., "0"), the sample 404N above the current central sample (e.g., first luma sample 404C) is used in the two-tap filter. If the signaled filter shape index has a second value (e.g., "1"), the sample 404S below the current central sample (e.g., first luma sample 404C) is used in the two-tap filter.

Alternatively, in some embodiments, a two-tap-filter is used in the classification, and the number of filter shape is explicitly signaled. An example of eight two-tap filters is shown in FIG. 5A, and an index value of the filter shape index 408S ranging from 0 to 7 is signaled to indicate which filter tap is used. Another example of twelve two-tap filters 256 is shown in FIG. 5B, and an index value of the filter shape index 408S ranging from 0 to 11 is signaled to indicate which filter tap is used.

In some embodiments, a five-tap filter (FIG. 7) is used for classification. In a frame level (or any other level where the sample offset control information signaled), a flag is signaled to select one of a five-tap filter or a three-tap filter. If the five-tap filter is selected, the semantic of the filter shape index 408S is modified. For example, in the three-tap-filter case, the filter shape index 408S (e.g., equal to one of 0-11) is used to indicate which two samples in FIG. 6B are used in classification. Conversely, in the proposed five-tap-filter case, the filter shape index 408S is used to indicate which group of samples in FIG. 7 is used. The group is selected from {1, 2}, {1, 3}, {1, 4}, {2, 3}, {3, 4}, and {3, 4}.

In some embodiments, multiple multi-tap filters is adaptively selected at the encoder 106 and signaled as a syntax element to the decoder 122. For example, one of a two-tap-filter (FIGS. 5A and 5B), a three-tap filter (FIGS. 6A and 6B), and a five-tap filter (FIG. 7) is adaptively selected. In an example, a syntax element with two bits is signaled at a frame level or any other levels where CCSO control information is signaled. In another example, the syntax element is signaled at the key frame level.

In some embodiments, the descripted multi-tap filters can be combined with any other pre-defined filter sizes, or quantizers that involved in the cross-component sample offset process. That is, the applicability of the proposed method is not limited by the changes of other part of the cross-component sample offset process.

In some embodiments, the number of filter shapes (e.g., 8 in FIG. 5A, 11 in FIG. 5B) is different depending on the number of filter taps. For example, the number of 2-tap filter shapes is 1, 2, 3, 4, . . . , or 16, while the number of 3-tap filter shapes is 4 (FIG. 6A), 5, or 6 (FIG. 6B).

In some embodiments, the number of classes L given by the classifier 412 (FIG. 8B) depends on the number (N) of filter taps. For example, in some embodiments, the number of filter taps is denoted by N, and the number of quantization intervals 418 (QI) for the differences between the neighboring sample located at the filter taps is denoted by M, then the number of classes L (FIG. 8B) given by the classifier 412 is determined by $M^N$. In one example, when two-tap filters are applied, the number of classes L (the number of entries in the offset look-up table 414) is determined as $M^2$.

In some embodiments, a number of applicable bands 804 (FIG. 8A) given by the classifier depends on the number (N) of filter taps.

In some embodiments, the number of applicable quantization intervals 418 (QI) and/or the candidate quantization step sizes used to derive the classifier 412 depends on the number (N) of filter taps.

Although FIG. 9 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 900 is implemented for decoding video data. The method 900 includes receiving (902) a video bitstream including a current coding block of a current image frame, wherein the video bitstream comprises (904) (i) a first syntax element for a cross-component sample offset (CCSO) mode indicating whether a first sample offset of a first color sample of the current coding block is determined based on one or more luma samples and (ii) a second syntax element for a filter type index and a filter shape index, the first type index indicating one of a plurality of filter types of a loop filter selected for the current coding block and the filter shape index identifying a set of one or more neighboring locations used by the loop filter; determining (910) one or more difference values between one or more neighboring luma samples and a first luma sample; quantizing (912) the one or more difference values to generate one or more quantized difference values; classifying (914) a first color sample based on the one or more quantized difference values to determine a first sample offset of the first color sample; and reconstructing (916) the current coding block, at least by adjusting the first color sample based on the first sample offset of the first color sample.

(A2) In some embodiments of A1, wherein the first color sample includes a first chroma sample that is co-located with the first luma sample in the current coding block, and the first chroma sample is adjusted based on the first sample offset.

(A3) In some embodiments of A1, wherein the first color sample is the first luma sample, and the first luma sample is adjusted based on the first sample offset.

(A4) In some embodiments of A1-A3, wherein the filter type index includes a type flag configured to select one of a two-tap filter and a three-tap filter.

(A5) In some embodiments of A1-A3, wherein the filter type index includes a type flag configured to select one of a four-tap filter and a three-tap filter.

(A6) In some embodiments of A1-A3, wherein the filter type index includes a multi-bit index configured to select one of at least a two-tap filter, a three-tap filter, and a four-tap filter.

(A7) In some embodiments of A1-A4, the method 900 further comprises: in accordance with a determination that the filter type index selects a two-tap filter, selecting one of a set of eight immediately adjacent luma samples as the one or more neighboring luma samples based on the filter shape index.

(A8) In some embodiments of A1-A4, the method further comprises: in accordance with a determination that the filter type index selects a two-tap filter, selecting one of a set of twelve adjacent luma samples as the one or more neighboring luma samples based on the filter shape index, wherein the set of twelve adjacent luma samples includes eight immediately adjacent luma samples, two luma samples located on the same row and separated from the first luma sample by two luma samples, and two luma samples located on the same row and separated from the first luma sample by four luma samples.

(A9) In some embodiments of A1-A6, the method further comprises: in accordance with a determination that the filter type index selects a three-tap filter, selecting one of a plurality of distinct combinations of two neighboring locations as the one or more neighboring luma samples based on the filter shape index.

(A10) In some embodiments of A9, the plurality of distinct combinations of two neighboring locations comprising at least (1) a first combination of a north luma sample and a south luma sample, (2) a second combination of a west luma sample and an cast luma sample, (3) a third combination of a northwest luma sample and a southeast luma sample, and (4) a fourth combination of a northeast luma sample and a southwest luma sample.

(A11) In some embodiments of A10, the plurality of distinct combinations of two neighboring locations further comprising a fifth combination of two luma samples located on the same row and separated from the first luma sample by two luma samples and a sixth combination of two luma samples located on the same row and separated from the first luma sample by four luma samples.

(A12) In some embodiments of A1-A4, A5, and A6, the method further comprises: in accordance with a determination that the filter type index selects a four-tap filter, concurrently selecting two of a plurality of distinct combinations of two neighboring locations as the one or more neighboring luma samples based on the filter shape index.

(A13) In some embodiments of A1-A12, wherein the filter type index and the filter shape index are signaled in the video bitstream at one of an image frame level and a key frame level for the current coding block.

(A14) In some embodiments of A1-A13, wherein each of the plurality of filter types corresponds to a set of one or more candidate filter shape indexes, each candidate filter shape index being unique and distinct from any other filter shape index of the respective filter type and any remaining filter type of the plurality of filter types.

(A15) In some embodiments of A1-A14, wherein the one or more difference values are quantized to a plurality of integer values in a quantization range using a scalar quantizer including a plurality of quantization intervals and a plurality of quantization levels, and each of the one or more quantized difference values includes a respective integer in the quantization range.

(A16) In some embodiments of A15, wherein: the one of the plurality of filter types of the loop filter selected by the filter type index has a first number N of taps; the plurality of quantization intervals includes a second number M of quantization intervals; and the first color sample is classified by a classifier having a third number L of classes, where L is equal to $M^N$.

(A17) In some embodiments of A15, wherein the one of the plurality of filter types of the loop filter selected by the filter type index has a first number N of taps, and the plurality of quantization intervals includes a second number M of quantization intervals, the method further comprising: in accordance with the first number N, determining the second number M and the plurality of quantization levels.

(A18) In some embodiments of A15, wherein the one of the plurality of filter types of the loop filter selected by the filter type index has a first number N of taps, and the first color sample is classified by a classifier having a third number L of classes, the method further comprising: determining the third number L based on the first number N.

(A19) In some embodiments of A1-A18, wherein the one of the plurality of filter types of the loop filter selected by the filter type index has a first number N of taps, and the first color sample corresponds to a plurality of bands, the method further comprising: determining a number of bands in the plurality of bands based on the first number N, each band corresponding to a respective value of the filter shape index that identifies a respective set of one or more neighboring locations used by the loop filter; based on a value of the first color sample, identifying one of the plurality of bands that includes the first color sample; and based on the identified one of the plurality of bands, identifying the respective value of the filter shape index and the respective set of one or more neighboring locations, thereby selecting the one or more neighboring luma samples for generating the first sample offset.

(A20) In some embodiments of A1-A19, classifying the first color sample based on the one or more quantized difference values further comprising: identifying a combination of the one or more quantized difference values in a lookup table associating a plurality of quantized difference combinations with a plurality of offset value options; and determining the first sample offset corresponding to the combination of the one or more quantized difference values in the lookup table.

(A21) In some embodiments of A20, wherein the plurality of filter types of the loop filter includes a first number of filter types, each filter type having a distinct number of filter taps, and the lookup table includes the first number of sub-tables each of which corresponds to a respective filter type.

(A22) In some embodiments of A21, wherein: the filter shape index selects one of a plurality of filter shapes corresponding to the filter type index of the loop filter; each filter type has a plurality of respective filter shapes each having a distinct combination of neighboring locations; and each filter type corresponds to a respective sub-table that consolidates associations of the quantized difference combinations with the plurality of offset value options for the plurality of respective filter shapes.

(A23) In some embodiments of A1-A22, wherein the method 900 further comprises identifying (906) the first luma sample of the current coding block and the first color sample that is co-located with the first luma sample in the current coding block; and identifying (908) the one or more neighboring luma samples of the first luma sample based on the filter type index and the filter shape index of the loop filter.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A20 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A22 above).

The proposed methods may be used separately or combined in any order. Further, each of the methods (or embodiments), encoder, and decoder may be implemented by processing circuitry (e.g., one or more processors or one or more integrated circuits). For example, the one or more processors execute a program that is stored in a non-transitory computer-readable medium. In the following, the term block may be interpreted as a prediction block, a coding block, or a coding unit, i.e., CU.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current coding block of a current image frame, wherein the video bitstream comprises (i) a first syntax element for a cross-component sample offset (CCSO) mode indicating whether a first sample offset of a first color sample of the current coding block is determined based on one or more luma samples and (ii) a second syntax element for a filter type index and a filter shape index, the filter type index indicating one of a plurality of filter types of a loop filter selected for the current coding block and the filter shape index identifying a set of one or more neighboring locations used by the loop filter;
when the filter type index selects a four-tap filter, concurrently selecting two of a plurality of distinct combinations of two neighboring locations as one or more selected neighboring luma samples based on the filter shape index;
determining one or more difference values between the one or more selected neighboring luma samples and a first luma sample;
quantizing the one or more difference values to generate one or more quantized difference values;
classifying the first color sample based on the one or more quantized difference values to determine the first sample offset of the first color sample; and
reconstructing the current coding block at least by adjusting the first color sample based on the first sample offset of the first color sample.

2. The method of claim 1, further comprising:
identifying the first luma sample of the current coding block and the first color sample that is co-located with the first luma sample in the current coding block; and
identifying the one or more selected neighboring luma samples of the first luma sample based on the filter type index and the filter shape index of the loop filter.

3. The method of claim 1, wherein the first color sample includes a first chroma sample that is co-located with the first luma sample in the current coding block, and the first chroma sample is adjusted based on the first sample offset.

4. The method of claim 1, wherein the first color sample is the first luma sample, and the first luma sample is adjusted based on the first sample offset.

5. The method of claim 1, wherein the filter type index includes a type flag configured to select one of the four-tap filter and a three-tap filter.

6. The method of claim 1, wherein the filter type index includes a multi-bit index configured to select one of at least a two-tap filter, a three-tap filter, and the four-tap filter.

7. The method of claim 1, further comprising:
in accordance with a determination that the filter type index selects a two-tap filter, selecting one of a set of eight immediately adjacent luma samples as the one or more selected neighboring luma samples based on the filter shape index.

8. The method of claim 1, further comprising:
in accordance with a determination that the filter type index selects a two-tap filter, selecting one of a set of twelve adjacent luma samples as the one or more selected neighboring luma samples based on the filter shape index, wherein the set of twelve adjacent luma samples includes eight immediately adjacent luma samples, two luma samples located on the same row and separated from the first luma sample by two luma samples, and two luma samples located on the same row and separated from the first luma sample by four luma samples.

9. The method of claim 1, further comprising:
in accordance with a determination that the filter type index selects a three-tap filter, selecting one of a plurality of distinct combinations of two neighboring locations as the one or more selected neighboring luma samples based on the filter shape index.

10. The method of claim 9, the plurality of distinct combinations of two neighboring locations comprising at least (1) a first combination of a north luma sample and a south luma sample, (2) a second combination of a west luma sample and an east luma sample, (3) a third combination of a northwest luma sample and a southeast luma sample, and (4) a fourth combination of a northeast luma sample and a southwest luma sample.

11. The method of claim 10, the plurality of distinct combinations of two neighboring locations further comprising a fifth combination of two luma samples located on the same row and separated from the first luma sample by two luma samples and a sixth combination of two luma samples located on the same row and separated from the first luma sample by four luma samples.

12. A method of encoding video data, comprising:
receiving video data comprising a current block of a current image frame;
determining whether to apply a cross-component sample offset (CCSO) mode for the current block, the CCSO mode indicating whether a first sample offset of a first color sample of the current block is based on one or more luma samples;

determining a filter type index and a filter shape index for the current block, the filter type index indicating one of a plurality of filter types of a loop filter selected for the current block and the filter shape index identifying a set of one or more neighboring locations used by the loop filter;

when the filter type index selects a four-tap filter, concurrently selecting two of a plurality of distinct combinations of two neighboring locations as one or more selected neighboring luma samples based on the filter shape index;

determining one or more difference values between the one or more selected neighboring luma samples and a first luma sample;

quantizing the one or more difference values to generate one or more quantized difference values;

classifying the first color sample based on the one or more quantized difference values to determine the first sample offset of the first color sample;

encoding the current block at least by adjusting the first color sample based on the first sample offset of the first color sample; and signaling, in a video bitstream, a first syntax element indicating a CCSO mode, and a second syntax element indicating the filter type index and the filter shape index.

13. The method of claim 12, further comprising:

identifying the first luma sample of the current coding block and the first color sample that is co-located with the first luma sample in the current block; and identifying the one or more selected neighboring luma samples of the first luma sample based on the filter type index and the filter shape index of the loop filter.

14. The method of claim 12, wherein the first color sample includes a first chroma sample that is co-located with the first luma sample in the current block, and the first chroma sample is adjusted based on the first sample offset.

15. The method of claim 12, wherein the first color sample is the first luma sample, and the first luma sample is adjusted based on the first sample offset.

16. The method of claim 12, wherein the filter type index includes a multi-bit index configured to select one of at least a two-tap filter, a three-tap filter, and the four-tap filter.

17. The method of claim 12, further comprising:

when the filter type index selects a two-tap filter, selecting one of a set of eight immediately adjacent luma samples as the one or more selected neighboring luma samples based on the filter shape index.

18. The method of claim 12, further comprising:

when the filter type index selects a two-tap filter, selecting one of a set of twelve adjacent luma samples as the one or more selected neighboring luma samples based on the filter shape index, wherein the set of twelve adjacent luma samples includes eight immediately adjacent luma samples, two luma samples located on the same row and separated from the first luma sample by two luma samples, and two luma samples located on the same row and separated from the first luma sample by four luma samples.

19. The method of claim 12, further comprising:

when the filter type index selects a three-tap filter, selecting one of a plurality of distinct combinations of two neighboring locations as the one or more selected neighboring luma samples based on the filter shape index.

20. A non-transitory computer-readable storage medium storing a video bitstream that is generated by a video encoding method, the video bitstream comprising:

coded information for a plurality of blocks, including a current block in a current frame;

a first syntax element for a cross-component sample offset (CCSO) mode indicating whether a first sample offset of a first color sample of the current block is determined based on one or more luma samples; and a second syntax element for a filter type index and a filter shape index, wherein:

the filter type index indicates a four-tap filter is selected for the current block, the four-tap filter being selected from a plurality of filter types for a loop filter;

the filter shape index identifies a set of one or more neighboring locations used by the loop filter; and the four-tap filter indicates concurrent selection of two of a plurality of distinct combinations of two neighboring locations as one or more selected neighboring luma samples based on the filter shape index;

wherein the coded information for the current block includes one or more quantized difference values for the current block, the one or more quantized difference values indicating a difference between the one or more selected neighboring luma samples and a first luma sample of the current block; and wherein the current block is encoded at least by adjusting the first color sample using the first sample offset for the first color sample, the first sample offset being based on a classification of the one or more quantized difference values.

21. The non-transitory computer-readable storage medium of claim 20, wherein the first color sample comprises a first chroma sample that is co-located with the first luma sample in the current block, and the first chroma sample is adjusted based on the first sample offset.

22. The non-transitory computer-readable storage medium of claim 20, wherein the first color sample is the first luma sample, and the first luma sample is adjusted based on the first sample offset.

23. The non-transitory computer-readable storage medium of claim 20, wherein the filter type index includes a multi-bit index configured to select one of at least a two-tap filter, a three-tap filter, and the four-tap filter.

* * * * *